United States Patent [19]

Smith

[11] 4,448,186
[45] May 15, 1984

[54] DEVICE FOR INCREASING THE EFFICIENCY OF COOKING ON GAS STOVES

[76] Inventor: George E. K. Smith, 163 E. 81st St., New York, N.Y. 10028

[21] Appl. No.: 313,382

[22] Filed: Oct. 21, 1981

[51] Int. Cl.³ .............................................. F24C 15/10
[52] U.S. Cl. ...................................... 126/215; 126/24; 126/214 D; 219/433; 219/462
[58] Field of Search ...................... 126/44, 43, 34, 38, 126/375, 389, 390, 24, 27, 376, 217, 218, 214, 215, 216, 220; 219/433, 460, 461, 462, 458

[56] References Cited

U.S. PATENT DOCUMENTS

| | | | |
|---|---|---|---|
| 10,118 | 10/1853 | Gilbert | 126/390 |
| 43,087 | 6/1864 | Britain . | |
| 222,673 | 12/1879 | Conover | 126/215 |
| 554,343 | 2/1896 | Johnson et al. | 126/215 |
| 600,398 | 3/1898 | Bailey | 126/215 |
| 923,690 | 6/1909 | Newsam . | |
| 983,413 | 2/1911 | Swafford . | |
| 990,102 | 4/1911 | Brewer . | |
| 1,367,333 | 2/1921 | Truesdell . | |
| 1,471,788 | 10/1923 | Gardner . | |
| 1,592,729 | 7/1926 | Feist . | |
| 1,643,434 | 9/1927 | Walther . | |
| 1,753,886 | 4/1930 | Glenn . | |
| 1,772,407 | 8/1930 | Wilhelm . | |
| 1,881,606 | 10/1932 | Humphreville . | |
| 2,003,773 | 6/1935 | Gross . | |
| 2,030,519 | 2/1936 | Hamilton . | |
| 2,513,011 | 6/1950 | Duarte . | |
| 2,797,298 | 6/1957 | Fujitani . | |
| 3,372,688 | 3/1968 | Moore | 126/24 |
| 4,119,021 | 10/1978 | Moses . | |
| 4,126,778 | 11/1978 | Cole . | |
| 4,313,050 | 1/1982 | Abenaim | 126/24 |

FOREIGN PATENT DOCUMENTS

| | | | |
|---|---|---|---|
| 69008 | 6/1915 | Austria | 126/215 |
| 4877 | of 1910 | United Kingdom | 126/215 |

Primary Examiner—Samuel Scott
Assistant Examiner—Carl D. Price
Attorney, Agent, or Firm—Brumbaugh, Graves, Donohue & Raymond

[57] ABSTRACT

A device for concentrating heat from a flame of a gas stove in combination with a cooking utensil includes a first collar rigidly attached to the cooking utensil and mating with a second collar attached to a grid of the stove. The collars may have several peripherally disposed vents. The second collar can be rotated to align the vents and control the venting of the flame of the stove.

2 Claims, 4 Drawing Figures

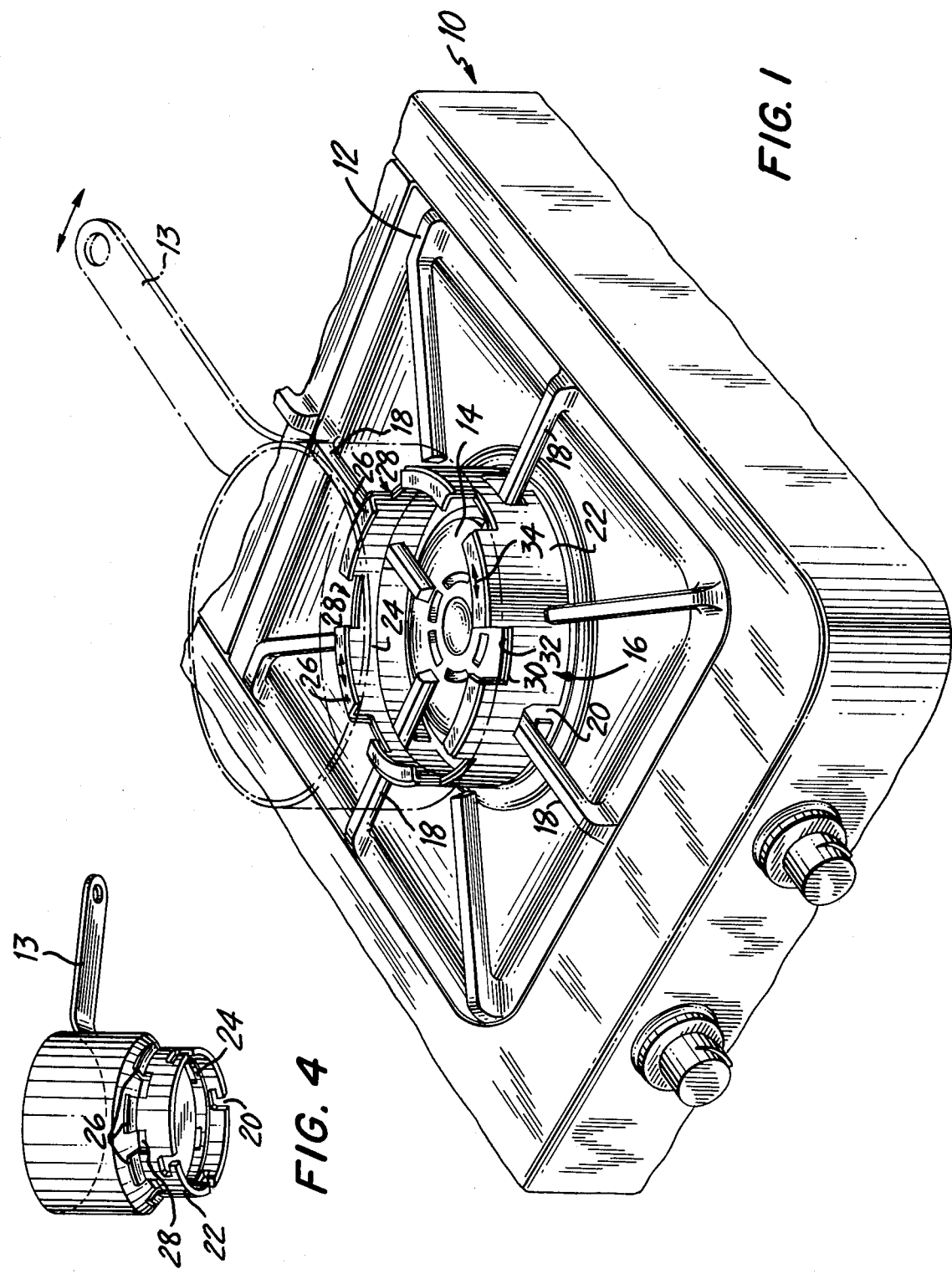

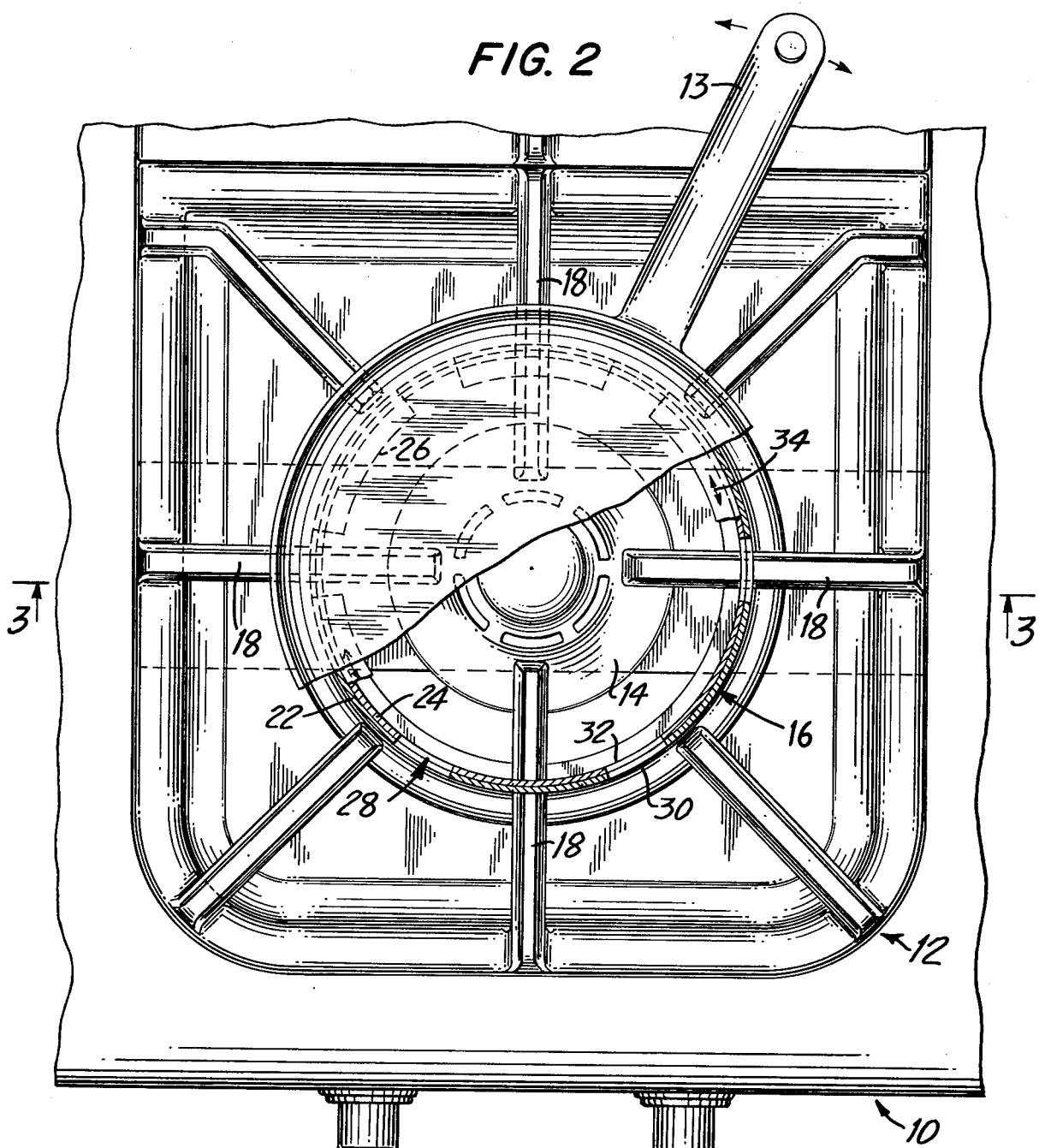
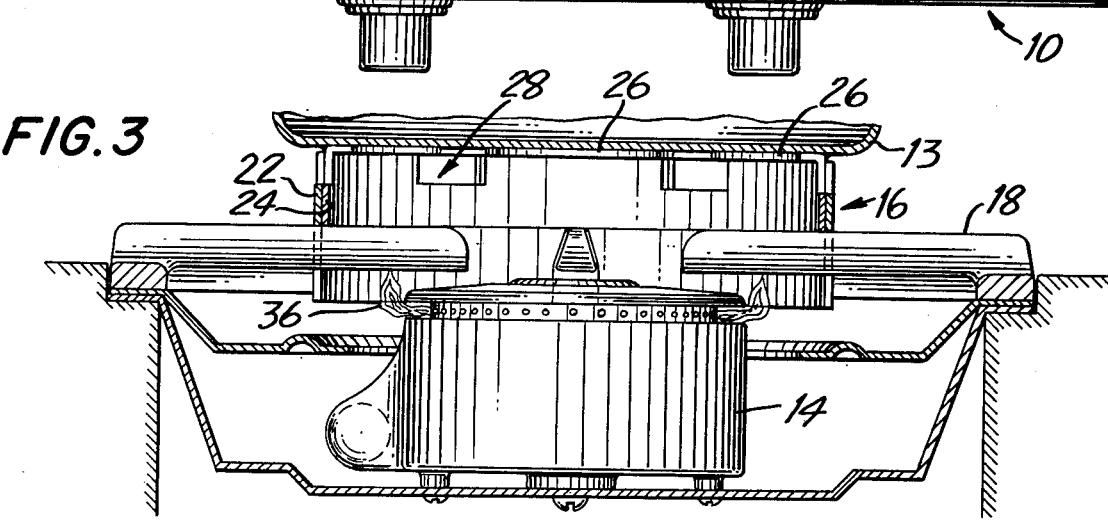

DEVICE FOR INCREASING THE EFFICIENCY OF COOKING ON GAS STOVES

BACKGROUND OF THE INVENTION

1. Field of the Invention

This invention relates to gas stoves, and more particularly, to devices for controlling heat losses from gas stoves.

2. Description of Prior Art

When a cooking utensil is placed on the burner of a gas stove, and the stove flame is ignited, considerable heat loss occurs through radiation of the heat from the flame into space. Because of this heat loss, a larger flame is required to be placed under the cooking utensil in order to obtain a proper heating of the contents of the utensil. Also, the belling effect of the flame results in the loss of heat which is directed away from the utensil.

Prior devices have been suggested to deal with the loss of heat resulting from the use of a gas range. However, these devices have generally been simple ring constructions which fit loosely about the burner of a gas stove and concentrate the heat from the flame on the bottom of the utensil. The rings are generally not attached to the utensil. In some of the prior devices, no venting is provided in the ring constructions. Accordingly, it is difficult to obtain a low temperature heating of a cooking utensil and its comestibles.

In one prior device, apertures are formed on the peripheral edge of a dual ring concentrator upon which a cooking utensil rests. The rings may be concentrically rotated so that the amount of venting is adjusted. However, the dual rings must be adjusted before the flame is lit, as no provision is made for turning the rings when they grow hot.

In another prior device, concentric rings with overlapping apertures for venting are provided. Screws and nuts lock the relationship between the inner and outer rings and hence, do not provide for adjustment of the venting during operation.

Accordingly, a need exists for eliminating some of the inefficiency of heating a utensil on a gas stove. Additionally, a need exists for a heat concentrator which can also permit the adjustable venting of the flame of a gas range.

SUMMARY OF THE INVENTION

A device for controlling the venting of a flame of a gas stove in combination with a utensil fits about the burner. The device includes a first cylindrical collar positioned about the burner of the stove. A second cylindrical collar is attached to the bottom of the utensil and overlaps a portion of the first collar. The mating of the first and second collars concentrates the heat from the flame on the bottom of a utensil. The first and second collars include corresponding slots. The second collar and the utensil rotate in relation to the first collar whereby the slots can be adjustably aligned to control the venting of the flame. Since the utensil is attached to the second collar, the relative positions of the collars can be adjusted during cooking to regulate the cooking of the comestibles in the utensil.

BRIEF DESCRIPTION OF THE DRAWINGS

A more complete understanding of the invention and its advantages will be apparent from the following Detailed Description taken in conjunction with the accompanying drawings in which:

FIG. 1 is a perspective view of a heat concentrating device in accord with the present invention with a cooking utensil depicted in phantom;

FIG. 2 is a plan view of a heat concentrating device partially in phantom, with a cooking utensil on a stove shown in cutaway;

FIG. 3 is a view of the heat concentrating device taken along the lines 3—3 of FIG. 2 and illustrating the burner of the stove and its position in relation to the cooking utensil and venting device; and FIG. 4 is a perspective view of a cooking utensil showing a portion of the concentrating device securely attached to the bottom of the utensil.

DETAILED DESCRIPTION

In FIG. 1, a conventional gas range 10 has a grid 12 upon which a cooking utensil 13 usually rests when heating the contents. The gas range or cooking stove 10 includes a burner 14 positioned below the grid 12. The flame from the burning gas extends from the burner 14 and heats the underside of the cooking utensil 13. In the course of heating the utensil 13, however, heat escapes around the sides and bottom edges and is lost for cooking purposes.

A heat concentrating device 16 in accord with the present invention is attached to the grid 12 of the gas stove 10 on four prongs 18. The prongs 18 are inserted through apertures 20 of an outer collar 22 forming a portion of the venting device 16. In the illustrated embodiment, the aperture 20 comprises a slot extending from the lower edge of the collar 22 and connected to a second circumferentially disposed slot which engages the prong 18. The device 16 is attached to the grid 12 by slipping the prong 18 through the aperture 20 and then rotating until the prong 18 engages the circumferentially disposed slot in the aperture 20. In this manner, the collar 22 is locked into position on the stove 10.

The device 16 includes the outer collar 22 and an inner collar 24. The inner collar 24 snugly mates with outer collar 22. The inner collar 24 extends from the upper edge of the outer collar 22 downwardly to contact the prongs 18. In one embodiment, the inner collar 24 has a series of arcuate segments or tabs 26 separated by venting slots 28. The arcuate segments or tabs 26 are used to attach the inner collar 24 to the cooking utensil 13, illustrated in phantom in FIG. 1 as a pan. Other cooking utensils may naturally be substituted for the pan 13 without departing from the spirit and scope of the invention. Other means for attaching the device 16 to the cooking utensil 13 will be suggested to those of skill in the art.

The venting slots 28 of the device 16 form a significant aspect of the present invention. The venting slots 28 are formed by matching up the slots 30 in outer collar 22 and the slots 32 in inner collar 24. In the illustrated embodiment, the slots 30, 32 fairly closely align in one position whereby the flame of the burner 14 can be vented. An important aspect of the present invention resides in the rotation of the cooking utensil 13 which rotates the inner collar 24 with respect to the outer collar 22 whereby the venting slots 28 can be opened or closed. The venting slots 28 extend from the upper edge of the inner and outer collars 22, 24 and extend downwardly towards the burner. Of course, the alignment of the slots 30, 32 can be changed, along with the configurations, to suit a particular application.

In FIG. 2, the cooking utensil 13 is shown cutaway to illustrate its attachment to the inner collar 24 by arcuate tabs 26. Although generally rectangular tabs 26 are shown in this embodiment, other connecting means can be used as long as the utensil 13 is securely attached to the collar 24.

Some of the arcuate segments or tabs 26 are cutaway to show the snug fit between the inner collar 24 and the outer collar 22. The snug fit between the collars 22, 24 helps to concentrate the heat produced by the flame of the burner 14. The arrow 34 indicates that the inner collar 24 can be rotated in either direction to close or open the venting slots 28 in the device 16.

In FIG. 3, a flame 36 issues from the burner 14 to heat the cooking utensil 13. The device 16 concentrates the heat on the bottom of the cooking utensil 13, thereby eliminating some of the inefficiency produced by the heat escaping around the cooking utensil 13. The device 16 is attached to the prongs 18 of the grid 12 whereby the cooking utensil 13 can be used to rotate the inner collar 24 in relation to the outer collar 22.

In FIG. 4, the secure attachment of the collar 24 to the bottom of the utensil 13 is to be discerned. The rigid attachment of the collar 24 to the utensil 13 by the tabs 26 forms a significant aspect of the present invention. The tabs 26 in FIG. 4 extend radially outwardly from the collar 24.

In operation, a flame 36 issues from the burner 14 of the range 10. The cooking utensil 13, with its attached inner collar 24, is positioned over the grid 12. The inner collar 24 snugly fits within the outer collar 22. When it is desired to concentrate the heat on the cooking utensil 13, the utensil 13 is rotated until the venting slots 28 formed by the aligning slots 30, 32 are closed. In the absence of the venting action of the venting slots 28, the heat is concentrated within the device 16 and on the bottom of the cooking utensil 13. When it is desired to decrease the heat transmitted to the cooking utensil 13, the utensil 13 is rotated until the venting slots 28 open to permit hot air to escape from within the device 16. The air vents the burner 14, reducing the amount of heat concentrated on the cooking utensil 13.

An important aspect of the present invention is its provision for adjusting the venting of the flame 36 during the cooking operation. Since the inner collar 24 is securely attached to the cooking utensil 13, rotational forces are transmitted from the handle of the cooking utensil 13 to adjust the alignment of the slots 30, 32. Unlike the prior devices, in which the venting was not adjustable, or was adjustable only when there was no flame 36, the device 16 can be adjusted throughout the cooking operation. In the beginning, the device 16 can be set to concentrate the full heat upon the utensil 13 quickly to heat the utensil 13. After the cooking temperature is reached, the device 16 can be adjusted to a lower temperature, as for simmering, simply by rotating the utensil 13. It can thus be understood that the device 16 can be used to heat the comestibles in a cooking utensil 13 with lesser amounts of heat and gas, thereby increasing the efficiency of the gas stove.

Further modifications from the disclosed embodiments with regard to the position and configuration of the venting slots 28 can be made for specific applications.

While more than one embodiment of the present invention has been shown in the figures and described in detail herein, various further modifications may be suggested to those of skill in the art without departing from the spirit and scope of the invention.

I claim:

1. A device for controlling the venting of a flame provided by a burner with support prongs of a gas stove in combination with a cooking utensil comprising:

collar means positioned proximate the burner of said stove and having a plurality of peripherally disposed first venting means;

mating means attached to and projecting from said utensil and rotatably mating with said collar means to enable (a) rotation and adjustment of the mating means by rotating the utensil during the cooking operation with the burner operative and (b) the removal of the pan and the mating means from the burner during the cooking operation to facilitate visibility and adjustment of the flames;

means for attaching said collar means to the burner support prongs of said stove; and peripherally disposed second venting means on said mating means for aligning with said first venting means of said collar means whereby rotation of said utensil and said mating means controls the venting of the flame of said stove.

2. A device for adjustably venting a flame provided by a burner with support prongs of a gas stove in combination with a cooking utensil comprising:

a first cylindrical collar positioned about the burner of said stove and having a plurality of peripherally disposed slots;

a second cylindrical collar attached to and projecting from the bottom of said utensil and overlapping a portion of said first collar;

a plurality of peripherally disposed slots in said second collar for aligning with said slots in said first collar;

a plurality of arcuate tabs projecting from said second collar for attaching said second collar to said utensil to enable (a) rotation and adjustment of the second collar by rotating the utensil during the cooking operation with the burner operative and (b) the removal of the pan and the second collar from the burner during the cooking operation to facilitate visibility and adjustment of the flame;

apertures in said first collar for mounting said first collar on the burner support prongs of said stove;

wherein said second collar and said utensil are positioned for rotating in relation to said first collar whereby the alignment of said slots controls the venting of said flame.

* * * * *